April 4, 1939. C. R. PATON 2,153,271
MOTOR VEHICLE
Filed Dec. 15, 1933 3 Sheets-Sheet 1

Patented Apr. 4, 1939

2,153,271

UNITED STATES PATENT OFFICE 2,153,271

MOTOR VEHICLE

Clyde R. Paton, Birmingham, Mich., assignor, by mesne assignments, to Robert C. Watson and Jennings Bailey, Jr., trustees, both of Washington, D. C.

Application December 15, 1933, Serial No. 702,615

13 Claims. (Cl. 280—95)

This invention relates to improvements in motor vehicles in general and more particularly to vehicles of the type in which the road wheels are independently sprung from the vehicle frame.

It is the principal object of the invention to provide a wheel supporting structure which will materially improve the riding qualities of the vehicle and the ease with which steering may be effected. As the result of the constant improvement of motor vehicle construction resulting in the development of heavier vehicles operable at extremely high maximum speeds, it has been found advisable to effect radical changes in wheel suspension and steering mechanism. Thus there is a need at the present time for a wheel suspension which is more readily adaptable to varying road conditions than has heretofore been found necessary, particularly in connection with the heavier and faster vehicles, and the employment of wheel suspensions in which the road wheels at opposite sides of the vehicle are permitted independent rising and falling movement offers one solution of the problem. This type of wheel suspension has long been used in Europe where it has been found desirable because of poor road conditions, although the problems arising in this country, where rough roads are very infrequently encountered and where large and extremely fast vehicles have been the rule rather than the exception, were not met abroad.

Accordingly, many difficulties have arisen in applying the principles of independent wheel suspension as employed in European countries to the heavier, higher speed vehicles operable under the road conditions which obtain in this country, and considerable modification of accepted European practice has been found necessary. For instance, difficulty has been encountered as the result of excessive side sway of heavy vehicles operated at high speed when independent spring suspension was used, and the adoption of spring suspensions of the type heretofore proposed has in general proven unsuccessful in eliminating the development of synchronous vibration in the steerable road wheels which is probably largely responsible for shimmy. Furthermore, in the development of wheel suspensions abroad, relatively little thought has been given to the steering mechanism and correct steering geometry has been the exception rather than the rule.

It is the purpose of the present invention to overcome these and other difficulties heretofore encountered in the adaptation of independent wheel suspension to local conditions. Thus it is proposed to employ in general in the present invention the pivoted link type of suspension, the construction and disposition of the links and of their pivotal axes with respect to the vehicle frame and with respect to the steering apparatus being such that decidedly smoother riding action and greatly improved steering control are obtained.

It is a feature of the invention that static friction in the wheel suspension is substantially eliminated and that the natural frequency of vibration of the elastic system when normally loaded is reduced to a minimum, whereby substantial improvement in riding characteristics is obtained.

It is a further object of the invention to provide an independent wheel suspension for motor vehicles characterized by relatively low unsprung weight which is nevertheless sufficiently sturdy for operation under the most severe conditions and when employed with heavy vehicles.

It is a further object of the invention to provide an independent wheel suspension of the pivoted link type for steerable road wheels in which perfect steering control is obtained, no undesired displacement of the road wheels about their steering axes resulting from rising and falling movement of the wheel.

Other objects and features of the invention will be apparent from the following description when taken in connection with the following drawings in which.

In describing the invention, reference will be made to the drawings illustrating one form of the invention only in the application thereof to the front steerable road wheels of a vehicle. It will nevertheless be understood that certain features of the wheel suspension shown herein are equally as applicable to the rear road wheels and to road wheels which are not steerable. It will furthermore be appreciated that while the various elements disclosed in the drawings are described hereinafter by specific language in order to facilitate an understanding of the principles of the invention and to simplify this descriptive matter, no limitation of the invention is thereby intended, various alterations of the structural details such as fall within the scope of the invention as defined within the appended claims being contemplated.

Figure 1:
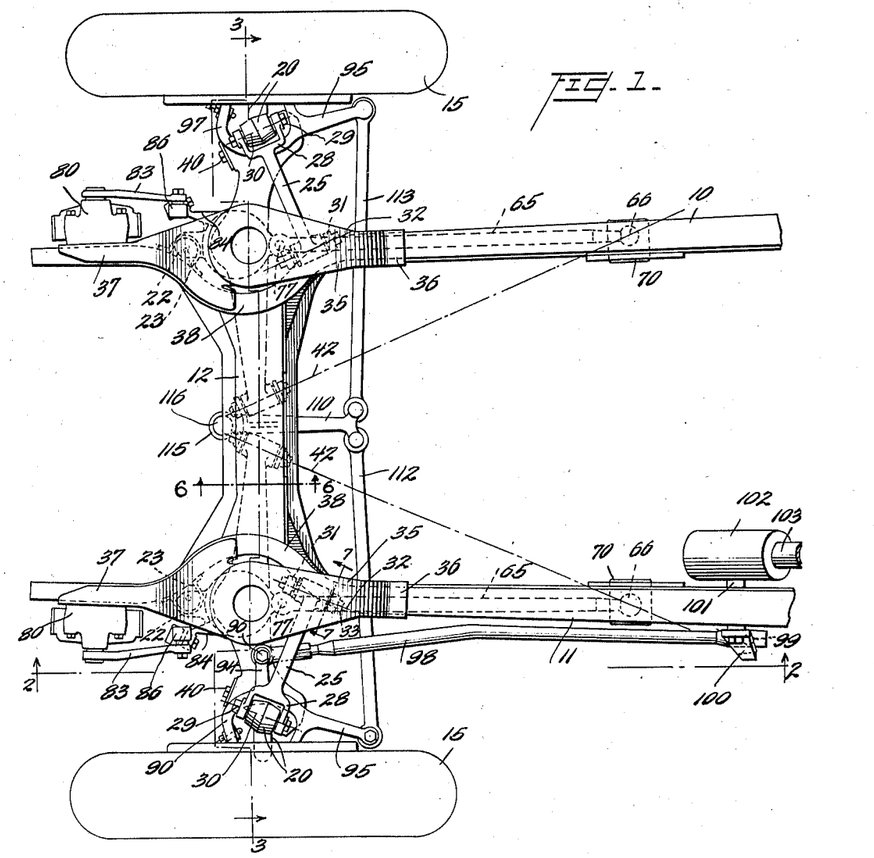
Figure 1 is a plan view of a portion of a motor vehicle frame illustrating the application thereto of one form of the invention.

Referring first to Figure 1 of the drawings, it will be observed that the vehicle frame is illustrated as including side frame members 10, which may be of the usual channel or box type, and a cross frame member 12 extending between and rigidly secured to the two side frame members 10 and 11. So far as the wheel suspension is concerned, the construction is preferably identical at the two sides of the vehicle, and it will therefore suffice in the following description to refer to those elements of the suspension disposed at one side only of the central longitudinal plane of the vehicle, the same reference characters being used in connection with corresponding elements associated with the two road wheels.

Thus each road wheel 15 is rotatably mounted in the conventional manner on a wheel spindle 16, the latter being provided with the usual brake backing plate 17. The wheel spindle 16 is preferably formed integrally with a steering knuckle 18, the latter being supported for swinging steering movement on a knuckle carrying member 20, for instance, by means of the usual king pin 21 which may extend through the knuckle and its supporting member.

Figure 3:
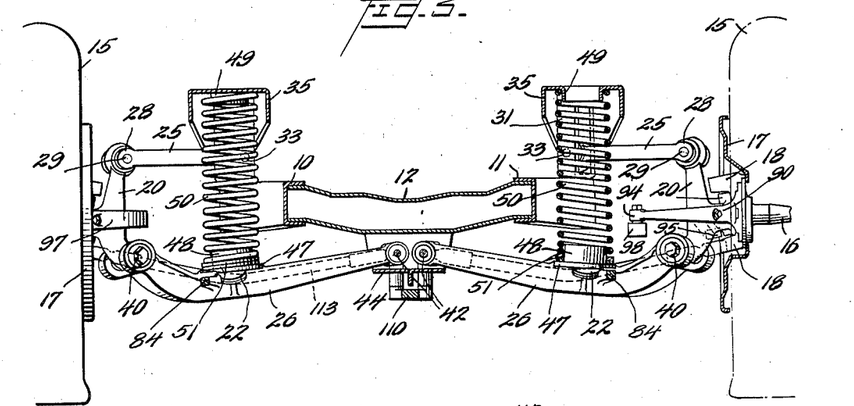
Figure 3 is a transverse sectional view taken substantially on the line 3—3 of Figure 1.
Figures 4, 5, 6, 7:
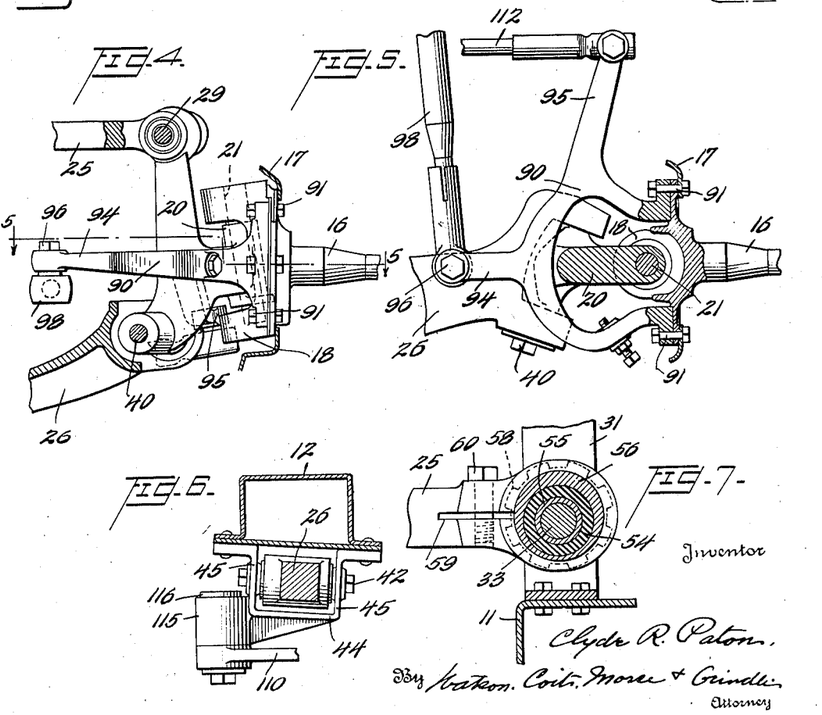
Figure 4 is an enlarged view of a portion of Figure 3, partly in section.
Figure 5 is a sectional view taken substantially on the line 5—5 of Figure 4.
Figure 6 is a fragmentary sectional view on line 6—6 of Figure 1.
Figure 7 is a sectional view on the line 7—7 of Figure 1.

The axis about which the knuckle rotates for swinging steering movement is preferably inclined to the vertical as shown in Figures 3 and 4 of the drawings, conventional practice being followed in determining the wheel camber. For convenience, however, the road wheel will be described hereinafter as executing steering movement about a substantially vertical axis, it being understood that this term is used in a sufficiently broad sense to cover such inclination with respect to the vertical as is required for practical considerations. It will also be understood that the road wheel, its supporting spindle, and associated knuckle, may be referred to for convenience as comprising a road wheel assembly.

The knuckle carrying member 20 is formed to provide upstanding and downwardly directed arms which constitute with the member 20 an integral unit. Since the precise shape of this member is not material, these integrally formed arms need not be separately designated, but in the form of the invention shown in the drawings they are pivotally connected respectively to upper and lower wheel supporting links 25 and 26 which are in turn pivotally connected at their inner ends to the vehicle frame. Thus the outer end of the wheel supporting link 25 may be formed to provide a yoke-shaped portion 28 embracing the upper end of the knuckle carrying member 20, the bolt 29 passing through the link 25 and the member 20 to connect the link and the member for relative movement about a pivotal axis 30. The inner end of the link 25 is similarly supported within a yoke-shaped member 31 for pivotal movement with respect thereto about an axis 32, a bolt 33 passing through the member 31 and the link 25, the axes 30 and 32 being parallel.

Figure 2:
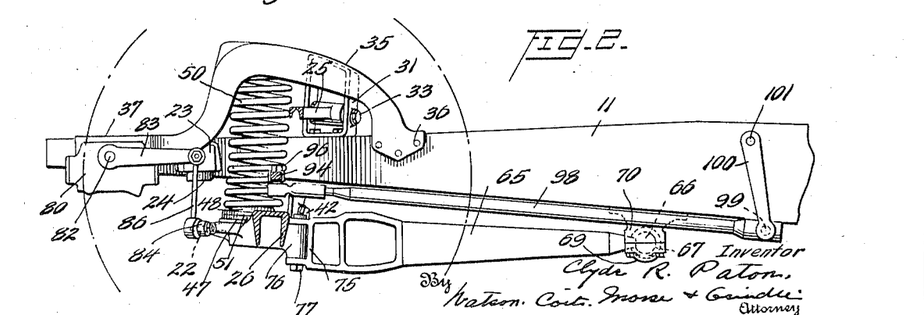
Figure 2 is a longitudinal vertical sectional view taken substantially on the line 2—2 of Figure 1.

The yoke-shaped member 31 is supported between the side frame member 10 or 11 and the frame bracket 35 and is rigidly secured to both, the bracket 35 being preferably shaped as shown in Figures 1 and 2 of the drawings and being secured to the side frame member as at 36 and 37, thus forming in effect a continuation of the side frame member, the latter being deflected or curved inwardly as at 38 adjacent the road wheel for a purpose hereinafter described.

The lower wheel supporting link 26 is similarly pivotally connected to the knuckle carrying member 20 and to the vehicle frame for swinging movement with respect to both about pivotal axes 40 and 42 respectively, the pivotal connection at the inner end of the wheel supporting link 26 to the frame including a bracket 44 which is secured to and dependent from the cross frame member 12 and which is provided with yoke-shaped portions 45 embracing the inner ends of the two links 26 at opposite sides of the center line of the vehicle, this arrangement being shown more particularly in Figure 6 of the drawings.

Means are provided to limit the upward movement of the wheel supporting links 25 and 26 and thereby the extent to which the associated road wheel assembly may rise. For instance, this means may comprise a forwardly directed lug 22 preferably formed integrally with each lower link 26, and a bracket 23 secured to the adjacent side frame member and provided with a cup-shaped portion receiving a block 24 of rubber or other deformable material, the rubber block being located in the path of movement of the lug 22. It will be understood that under normal conditions the links 26 will not rise to a sufficient extent to engage the rubber blocks carried by the frame but it is desirable to provide some yielding abutment for the links, particularly for an emergency such as the breakage of the vehicle springs, which will now be described.

Each lower wheel supporting link 26 is provided intermediate its ends with a spring seat 47 and an upstanding boss 48 on the upper face thereof, the latter forming a guide for a coiled spring 50 which is interposed under compression between the link 26 and the bracket 35, the latter being provided with a downwardly directed annular flange 49 forming a guide to receive the upper end of the spring 50. In order to compensate for inaccuracies in manufacture and to insure uniformity of the springs at opposite sides of the vehicle, one or more shims 51, preferably of annular shape, may be inserted beneath either spring 50 to adjust the degree of initial compression thereof.

It will be observed that the spring seat 47 is shown in Figure 3 of the drawings as defining a plane inclined to a slight extent with respect to the plane defined by the spring seat formed by the bracket 35; in other words, the spring seat 47 is not precisely perpendicular to the general axis of the spring 50 which it receives in the normal or mid-position of the link 26. Thus, as the link 26 is swung upwardly about its axis 42 of pivotal connection with the vehicle frame, the angular relationship of the spring seat 47 and the axis of the spring 50 will be gradually altered until the seat reaches a position in which the inclination is the reverse of that hereinbefore described, this construction being adapted to equalize the stress on the spring convolutions as the link 26 rises. In a position intermediate the normal and uppermost positions of the link 26, the spring seats at opposite ends of the spring will define substantially parallel planes. If desired, the function of the rubber block 24 and the lug 22 in limiting upward movement of the wheel may be performed by other means than that illustrated, for instance, by one or more abutments of rubber or the like positioned between the opposed spring seats and within the spring 50.

Returning now to the pivotal axes 30 and 32 of the upper link 25 and the axes 40 and 42 of the lower link 26, it will be observed that these are all parallel so that the knuckle carrying member 20 and the road wheel 15 supported thereby may rise and fall in an arcuate path. If the links 25 and 26 were of the same length, a supporting parallelogram structure would be provided, and the knuckle carrying member 20 would pass through a series of parallel positions during rising and falling movement of the road wheel. Accordingly, any portion of the wheel assembly would execute a circular arc about a corresponding point disposed inwardly thereof and would therefore be subjected to actual bodily inward displacement as well as upward displacement, this being characteristic of the usual parallelogram structure. Thus the wheel tread, on meeting an obstruction, would be carried inwardly and thereby displaced laterally of the road bed, resulting in rapid wear of the tire.

However, in the present construction employing a lower link of greater length, the vehicle wheel is not only moved bodily inward as it rises by reason of the parallel link arrangement, but because of the difference in the length of the links, the plane of the wheel is altered as the wheel rises, the upper portion of the wheel moving inwardly to a greater extent than the lower portion thereof. It is therefore apparent that by suitable relative dimensioning of the links this inclination of the wheel as it rises may be utilized to compensate for the inward shifting of the tread portion, and the point of contact of the tread with the ground may be caused to rise substantially vertically and scuffing of the tires such as would occur if the links were of equal length is thereby avoided.

As mentioned hereinbefore, one of the features of the invention is the substantial elimination of static friction in the wheel suspension structure. With this end in view anti-friction bearings are preferably employed in each of the pivotal axes at the inner and outer ends of the wheel supporting links 25 and 26. In one form of the invention these bearings are of a well-known commercial type employing a rubber sleeve, the construction being such that the rubber is stressed as the parts partake of relative pivotal movement, static friction being thereby eliminated. One form of bearing of this type is shown in Figure 7 of the drawings in which the rubber sleeve 54 is shown as interposed between an inner sleeve 55 surrounding the bolt 33 and an outer sleeve 56, the rubber being forced between these sleeves under pressure, so that no rubbing occurs as one sleeve is rotated with respect to the other. The outer sleeve 56 is secured against rotation with respect to the link, and the inner sleeve 55 is secured against rotation with respect to the bearing support, so that as the link is swung through a small arc about its pivotal axis, distortion of the rubber without actual surface friction occurs. Other types of anti-friction bearing, for instance roller or ball bearings may be employed to reduce static friction.

Figure 7 actually illustrates a special form of bearing which is preferably employed in connection with one of the pivotal axes only of the wheel supporting links, for instance, the pivotal support for the inner end of the upper link 25. In this special form of bearing, the sleeve 56 is eccentric and is provided adjacent one end with a toothed annular flange 58 whereby the sleeve can be rotated, the inner end of the link 25 being split as indicated at 59 and clamped in position on the sleeve 56 by means of one or more bolts 60. Thus it is possible to rotate the sleeve 56 by means of the toothed portion 58 and thereafter to secure this sleeve in any position to which it may be rotated by tightening the bolt 60, thereby displacing the link 25 inwardly or outwardly as may be desired. The purpose of this construction is to permit adjustment inwardly or outwardly of the pivotal connection between the member 20 and the link 25 to compensate for slight errors in dimensioning of the several component parts of the wheel suspension which might affect the camber of the wheel. Alternatively, the link may be so constructed as to permit lengthening or shortening thereof, whereby accurate adjustment of the wheel camber may be effected after the parts have been assembled.

As hereinbefore mentioned, the axes 30, 32, 40, and 42 at the inner and outer ends of the links are all parallel, and it will be observed from the drawings that these axes are inclined downwardly toward the rear of the vehicle from a horizontal plane and inwardly toward the front of the vehicle from a vertical plane containing the longitudinal axis of the vehicle. In the preferred embodiment of the invention the downward inclination of the axes of the wheel supporting links is approximately 5°, and the inclination with respect to the longitudinal vertical plane of the vehicle is approximately 23°, although there are various factors affecting the inclination of these axes which may necessitate a greater or less inclination than that illustrated. One purpose in inclining these axes with respect to either the horizontal or the vertical planes is to insure that the road wheels will yield slightly on meeting an obstruction. Thus as either road wheel rises, it moves through a path having a component directed rearwardly of the vehicle and thus moves away from rather than toward any obstruction, the ease with which an obstacle may be surmounted being thereby increased. Another important feature of the inclination of these axes relates to the manner in which the steering mechanism is associated with the wheel suspension, a point which will be referred to hereinafter.

In order to adequately resist braking torque and other stresses in the wheel suspension, a torque arm 65 is provided, this torque arm having a pivotal connection about a substantially vertical axis with the wheel suspension system and an articulated connection with the vehicle frame. Thus the torque arm 65 extends substantially longitudinally of the vehicle and may be provided at its rear end with a substantially spherical head 66 which is received in a complementary semi-spherical seat 67 comprised in a bracket 70 secured to the frame. A sheath of rubber is interposed between the associated elements and is clamped in position by means of a semi-spherical cap member 69 bolted or otherwise secured to the bracket 70, the degree of pressure applied to the rubber being such as to insure that there will be no surface slippage giving rise to static friction. At its forward end the torque arm 65 is provided with a yoke-shaped member 75 receiving a rearwardly directed lug 76 which is preferably formed integrally with the lower wheel supporting link 26, a bolt 77 passing through the torque arm and the lug 76.

On the application of brakes to a rapidly moving vehicle, a torsional stress is applied to the wheel suspension, each wheel assembly tending to rotate about the point of contact of the wheel tread thereof with the ground in a counter-clockwise direction as viewed in Figure 2 of the drawings. This twisting effort or braking torque is adequately resisted by the torque arm 65 which not only transmits the applied force to the vehicle frame, but utilizes this force to stabilize the vehicle frame and body. Thus as the torque arm 65 tends to rotate in a counter-clockwise direction, the force is applied to the forward end of the frame tending to lift the latter and thus to counteract either wholly or in part the dipping of the front end of the vehicle as the latter is braked, which is characteristic of most spring suspensions.

It is an important feature of this construction that practically the entire stress which is applied to the wheel suspension by the vehicle load and on braking of the vehicle is carried through the lower link 26 and the torque arm 65 to the frame with the result that the stress on the bearings normally resulting from application of the brakes is greatly reduced. At the same time the lower members of the wheel suspension may be the larger and sturdier, the upper link and associated parts being relatively light, whereby the center of gravity of the suspension is maintained as low as possible.

Shock absorbers 80, likewise acting through the lower links, are preferably carried on the vehicle frame and are illustrated as secured to the side frame members 10 and 11 adjacent the respective forward ends of the latter and forwardly of the wheel suspension. The location of the shock absorbers at the extreme forward end of the frame reduces materially the tendency of the vehicle to rock about transverse axes, the mass balance of the frame being improved. Furthermore, the shock absorbers when so positioned are rendered accessible for replacement or repair without disturbing the wheel suspension. It is important that shock absorbers of the hydraulic type as distinguished from the friction type be employed in order that the static friction may be maintained as low as possible as hereinbefore explained. While any conventional type of shock absorber may be employed, for instance the hydraulic shock absorber shown and described in my prior filed application for Letters Patent, Serial No. 700,289, filed November 29, 1933, it is preferred to employ a hydraulic shock absorber of the type which is responsive to accelerative movements of the road wheels, and for this purpose a device such as that illustrated in Figures 9 to 11, inclusive, of the patent to Griswold, No. 1,882,280, granted October 11, 1930, may be adopted.

The operating connections to each shock absorber may comprise the usual shaft 82 extending within the housing 80 and having secured thereto exteriorly of the housing a rearwardly extending arm 83 which is in turn connected with a lug 84, formed integrally with the lower wheel supporting link 26, by means of a rod 86 having articulated connection with the arm 83 and the lug 84. Thus, as either road wheel rises and falls, the corresponding shaft 82 will be rocked to effect movement of fluid within the housing 80, thus tending to damp the wheel movement.

The use of coiled springs in the present arrangement contributes largely to the excellent riding qualities of vehicles equipped with the type of wheel suspension disclosed herein. In the first place, static friction can be eliminated from leaf springs only by a special construction involving increased expense and frequent repairs and replacements. In the second place, it is a feature of the present invention that low rate springs are employed, it having been found that relatively slow vertical movement of a vehicle body is much less disturbing to occupants of the vehicle than the more rapid movement of the frame and body such as usually occurs when stiff leaf springs are employed. Since it is not practicable to design a leaf spring having a low natural frequency which is at the same time sufficiently strong to support a heavy load, the coiled spring offers the only satisfactory solution in the application of this principle to the heavy modern vehicle. It may be stated generally that it is desirable to employ coil springs at the front of the vehicle of such characteristics that under normal loading the frequencies of the elastic systems at the front and rear of the vehicle are approximately equal. Under such circumstances the movement of the vehicle body is principally one of translation, the body being always maintained parallel to the general plane of the road surface. Thus in passing over a surface of irregular contour, the tendency of the vehicle to dip fore and aft is substantially eliminated. It is therefore highly desirable that the frequency of the front springs when normally loaded be at least as low as that of the rear springs.

By the employment of shock absorbing devices of the type shown in the patent to Griswold hereinbefore referred to, which may be briefly described as centrifugal shock absorbers, the resistance offered thereby to relative movement of the vehicle and frame may be proportioned to the acceleration of this movement. Thus by reason of the absence of static friction in the wheel suspension and in the shock absorber, as well as by reason of the lower resistance offered by the shock absorber to relative movement of low acceleration between the frame and wheels, the wheels may normally rise and fall freely without resultant rising and falling movement of the body, the shock absorber acting primarily to resist sudden and highly accelerated movements which must necessarily be retarded and damped.

Referring now to the steering mechanism, it will be observed that the steering knuckle 18 at the left hand side of the vehicle carries the steering lever 90 which is preferably secured to the knuckle as at 91, this lever having an inwardly directed arm 94 and a rearwardly directed arm 95. The arm 94 is pivotally connected as at 96 to a rod 98 serving as a steering drag link, the latter having a pivotal connection at 99 to the usual steering drop arm 100. The arm 100 is carried by a steering shaft 101 extending through the side frame member 11 and within the usual steering housing 102 located at the lower end of the steering column 103. The housing 102 may contain the conventional gearing for swinging the steering drop arm 100 forwardly and rearwardly to swing the arm 94, the steering knuckle, and the wheel as is customary. However, the present steering mechanism departs from the conventional type in the disposition of its several elements with respect to the pivotal axes of the wheel suspension, the construction being such that there is no tendency to impart undesired steering movement to the road wheel as the latter rises and falls.

It will be observed that during rising and falling movement of the road wheel at the left hand side of the vehicle, the inner end of the steering arm 94 to which the drag link 98 is connected will move in an arcuate path lying in a plane perpendicular to the pivotal axes of the supporting links 25 and 26. It will also be seen that, disregarding the connection of the drag link 98 with the arm 94, the drag link may swing about the point of pivotal connection thereof with the drop arm 100 and thus the forward end of the drag link is likewise capable of describing an arc. In the present construction the length of the drag link 98 and the disposition of the point of pivotal connection of the drag link with the arm 100 are such that the forward end of the drag link may execute an arc conforming substantially to the arc executed by the inner end of the arm 94 as the latter rises and falls with the road wheel assembly.

Stated differently, it is found that the inner end of the arm 94 executes within certain limits of movement a substantially circular arc in a plane perpendicular to the axes of the inner ends of the links 25 and 26 as hereinbefore explained. If this substantially circular arc be conceived as constituting a portion of the base circle of an imaginary right cone, the cone axis being parallel to the axes of the links 25 and 26 and the point of pivotal connection between the drag link 98 and the drop arm 100 lying at the cone apex, it is quite obvious that the drag link will correspond in position to an element of the cone, and that the forward end of the drag link will necessarily describe an arc coinciding with the arc executed by the arm 94 to which it is connected. In this manner the drag link 98 may be permitted to swing freely with the wheel assembly during the rising and falling movement of the latter with no resulting tendency to displace the wheel assembly about its steering axis, and disturbances of the steering mechanism resulting in wear on the tires or likely to induce shimmy are thereby materially reduced or eliminated.

It will be appreciated that there are a number of factors which affect in varying degree the curvature and location of the arc executed by the inner end of the steering arm 94, for instance the length of the links 25 and 26, the angular disposition of the pivotal axes of the links 25 and 26 with respect to horizontal and vertical planes, and the position occupied by the steering arm with respect to these axes. However, when these factors are coordinated in such a manner that the steering arm 94 describes an arc which does not deviate materially (within the normal range of movement of the road wheels in rising and falling) from a segment of a circle, it is possible to locate the drag link 98 in the manner hereinbefore described to secure perfect steering. Alternatively, if it be desired for convenience or from practical considerations to locate the steering drop arm 100 at some general position with respect to the vehicle frame, variation of the several factors referred to, and principally the inclination of the axes of the wheel supporting links 25 and 26 with respect to horizontal and vertical planes, may permit the wheel suspension to be accommodated accordingly.

It may be pointed out here that in the illustrated embodiment of the invention the wheel supporting links 25 and 26 are shown in the normal or mid-position thereof as defining substantially parallel planes, the drag link 98 and the planes of the wheel supporting links forming substantially equal angles with a horizontal plane. The present invention nevertheless contemplates such departure from this disposition of the parts as may be found desirable, and under some circumstances the links 25 and 26 may extend either downwardly or upwardly from the inner pivotal axes thereof in the normal or mid-position and may define planes which intersect at an acute angle. In this connection it will be apparent that adjustment of the position of the upper wheel supporting link 25 may result in some alteration of the relative positions of the upper and lower wheel supporting links.

Again, it may be pointed out that while the axes of the wheel supporting links in the preferred form of the invention extend inwardly and forwardly toward the longitudinal axis of the vehicle, the direction of these axes might be altered or even reversed. Thus the axes might be directed inwardly toward the rear of the vehicle, in which case it would be necessary to alter the relative position of the steering drag link or to adopt some other form of steering mechanism such as hereinafter described. It will be observed, however, that it is only necessary under any circumstances that the drag link 98 be so located as to constitute in effect an element of a cone defined as hereinbefore explained. The inclination of the axes of the wheel supporting links 25 and 26 and the relative disposition of these links with respect to horizontal and vertical planes and with respect to the position of the drag link 98 which is shown in the accompanying drawings nevertheless illustrates the preferred form of the invention. This arrangement permits connection for conjoint steering movement of the road wheels at opposite sides of the vehicle in a manner which is not only convenient but which insures perfect steering under all conditions of operation.

Thus the rearwardly directed arm 95 of the steering lever 90 at the left hand side of the vehicle is connected to a lever 110 by means of a tie rod 112 having articulated connection with the arm 95 and the lever. At the right hand side of the vehicle a similar steering arm 95 is formed on a steering lever 97 rigidly secured to the adjacent steering knuckle 18, and the arm 95 is likewise connected with the lever 110 by means of a tie rod 113. The lever 110 is supported for pivotal movement about a substantially vertical axis on the bracket 44 hereinbefore referred to, this bracket being provided with a forwardly extended boss 115, a bolt 116 passing through the boss and serving as a fulcrum for the lever 110 as shown more particularly in Figure 6 of the drawings. By means of this construction the two road wheels are caused to execute similar steering movements in response to displacement of the steering drag link 98 longitudinally of the vehicle.

The points of pivotal connection for the tie rods 112 and 113 are shown in the drawings as located adjacent or substantially in the plane defined by the axes of the respective lower links 26 and each rod will partake generally of the same movement when the wheels rise and fall as the associated lower link. Thus if either rod be swung about the point of connection thereof with the lever 110, the outer end of the rod will describe an arc substantially coinciding with the path of movement of the inner end of the corresponding arm 95, so that displacement of either road wheel about its steering axis as the wheel rises and falls is avoided.

It will be observed here that the principle whereby the steering drag link 98 and the steering knuckle arm 94 are caused to describe the same arc in space may also be applied to the cross connecting linkage between the two road wheels. Thus the rearward end of either arm 95 describes, within the usual limited range of rising and falling movement of the associated wheel, a substantially circular arc which may be considered as defining the periphery of the base of a hypothetical right circular cone, since the arc in question is described in a single plane perpendicular to the axes of the supporting links 25 and 26. The point of pivotal connection between either tie rod 112 and 113 with the lever 110 may then be so located as to lie on the axis of or to coincide with the apex of the cone defined by the movement of the associated steering knuckle arm, in which event the tie rod will correspond to an element of the cone and the outer end thereof may describe the periphery of the cone base when the rod is swung about its point of pivotal connection with the lever 110. Improper displacement of the steering parts connecting the road wheels as the latter rise and fall is thereby avoided.

Figure 8:
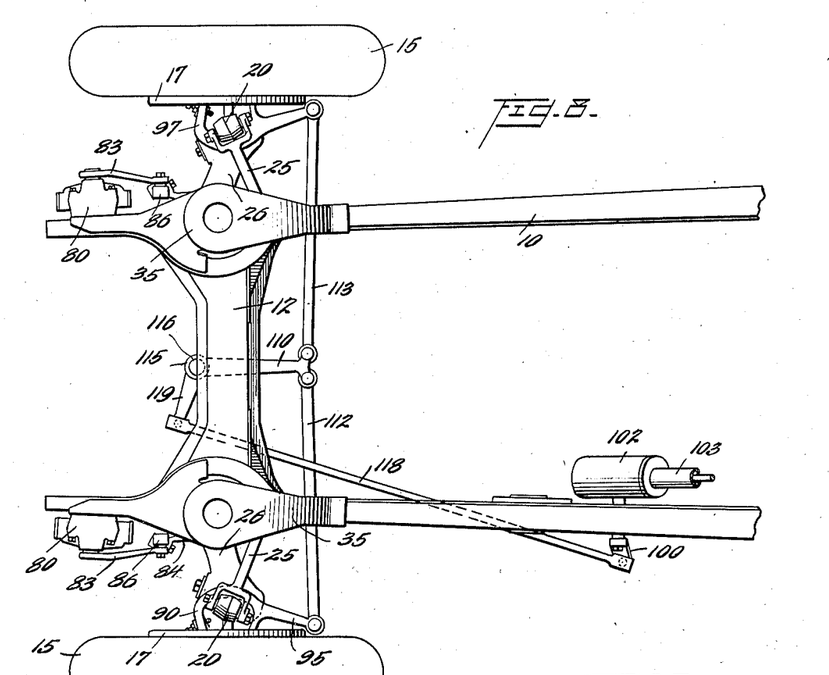
Figures 8 and 9 are plan views illustrating modified forms of steering mechanism.

Referring now to Figure 8 of the drawings, it will be seen that a modified form of steering mechanism is disclosed, the sole difference between this construction and that previously described lying in the omission of the usual steering drag link and the connection of the steering drop arm with the bell crank lever at the center of the vehicle. Reference characters employed in connection with the previously described form of the invention are therefore applied to Figure 8 to describe similar parts.

Thus the steering drop arm 100 is connected by means of a link 118 with an arm 119 formed integrally with and extending laterally from the lever 110, the link having an articulated connection with the arms 100 and 119. The principles heretofore outlined are followed in insuring against improper displacement of the tie rods 112 and 113 and since the link 118 is pivotally connected to members which are supported on the vehicle frame, there can be no displacement of this link as the road wheels rise and fall.

This construction lends itself particularly well to a wheel suspension which differs from that hereinbefore described only in the direction in which the pivotal axes of the wheel supporting links are inclined with respect to the vertical longitudinal plane of the vehicle. Thus it is quite obvious that the pivotal axes of the links can be directly rearwardly and inwardly toward the center of the vehicle rather than forwardly and inwardly as herein illustrated without affecting the steering geometry when the steering mechanism shown in Figure 8 is employed. However, the preferred illustrated arrangement of the link axes permits employment of either a steering drag link connected with the wheel assembly as shown in Figures 1 and 9 or control of the wheels from a central point as shown in Figure 8.

Figures 9, 10:
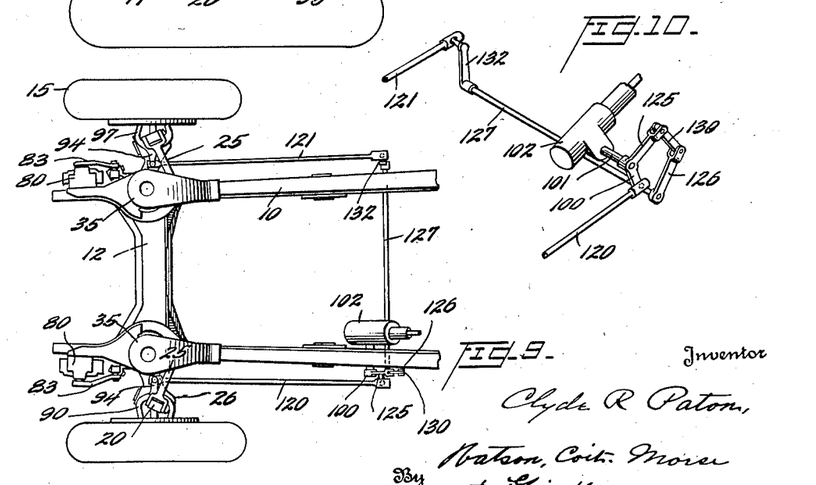
Figure 10 is a perspective view of a portion of the steering mechanism shown in Figure 9.

Referring now to Figures 9 and 10 a further modification is illustrated in which two steering drag links 120 and 121 are employed, the steering drag link 120 having an articulated connection with a steering knuckle arm 94 as described with reference to the first form of the invention and the drag link 121 being similarly connected with a like arm 94 carried by the steering knuckle at the right hand side of the vehicle. The rear end of the drag link 120 is pivotally connected with the usual steering drop arm 100 secured to the steering shaft 101 and operable by gearing within the steering housing 102 as hereinbefore explained. Formed integrally with the arm 100 is a second arm 125 which is connected with an arm 126 rigidly secured to a shaft 127 by means of a link 130 which is pivoted to the arms 125 and 126. The shaft 127 extends transversely of the vehicle frame and is journalled in the side frame members 10 and 11 in any convenient manner. At the right hand side of the vehicle the shaft 127 is provided with an upstanding arm 132 having an articulated connection with the drag link 121.

By reason of the connecting linkage between the shafts 101 and 127, the arms 100 and 132 will be rotated in the proper directions to effect the correct conjoint movement of the road wheels for steering purposes and it will be appreciated that the leverage of this connecting linkage is such that the same amplitude of movement will be imparted to each of the drag links for a given rotational movement of the steering shaft. The points of connection between the drag links 120 and 121 and the arms 100 and 132 respectively are so chosen with respect to the wheel suspensions with which they are associated that perfect steering is obtained in the manner hereinbefore described.

In the foregoing description it will be apparent that an extremely sturdy construction is provided. The major portion of the stresses applied to the wheel suspension systems including torsional, longitudinal, and vertical stresses, are carried by the lower links 26 and the associated torque arms, and by providing adequate bearings for these members, lighter and less expensive construction may be employed for the upper links 25 and their bearings. Twisting of the vehicle frame is materially reduced by the location of the vehicle springs substantially on the neutral axis of the side frame members.

The employment of coil springs in the manner described makes possible the extremely comfortable riding resulting from the provision of an elastic system, including the body, the frame, and springs, having a natural frequency far below that which is possible when leaf springs are employed without sacrifice of adequate spring strength to support heavy loads.

Having thus described the invention, what is claimed as new and desired to be secured by Letters Patent is:

1. In a motor vehicle, the combination with a vehicle frame comprising longitudinally extending side frame members, of a pair of road wheels disposed adjacent said side frame members at opposite sides thereof, means including laterally extending links, each link having articulated connection with said frame and one of said road wheels, supporting the latter for rising and falling movement with respect to the frame, and coil springs acting between said frame and said links, each of said springs extending above and below the adjacent side frame member and lying generally in the longitudinal vertical plane of the side frame member, said side frame members being deformed in the horizontal plane thereof and adjacent the springs to pass partly around said springs.

2. In a motor vehicle, the combination with a vehicle frame comprising longitudinally extending side frame members and a laterally extending cross frame member extending between and secured to said side frame members, of a pair of road wheels disposed adjacent said side frame members at opposite sides thereof, wheel supporting members carrying said road wheels, pairs of links extending laterally of said frame, the links of each pair being pivotally connected to said frame and to one of said wheel supporting members, whereby said wheels may rise and fall with respect to the frame, at least one link of each pair being pivoted to said cross frame member, coil springs acting between said last named links and said frame to resist upward movement of said wheels, said coil springs lying generally in the longitudinal axes of said side frame members, said side frame members being curved inwardly adjacent said springs to partly embrace the latter.

3. In a motor vehicle, the combination with a vehicle frame comprising longitudinally extending side frame members, of road wheels disposed adjacent and laterally of said side frame members, means supporting said road wheels on said vehicle frame for rising and falling movement with respect thereto, each side frame member being curved inwardly toward the other side frame member adjacent the associated wheel, coil springs lying in the general longitudinal axes of said side frame members and partly embraced by the curved portions of the latter, and members extending over said coil springs and above said side frame members and secured to the latter, said coil springs acting between said last named members and said road wheel supporting means to resist upward movement of said road wheels.

4. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined downwardly toward the rear with respect to a horizontal plane, longitudinally extending torque arms, each having articulated connection with said vehicle frame and with one of the links of each pair for resisting braking torque, members carrying said road wheels and having pivotal connections with the links of each pair, and means for yieldingly resisting upward pivotal movement of the links.

5. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined downwardly toward the rear with respect to a horizontal plane, longitudinally extending torque arms, each having articulated connection with said vehicle frame and with one of the links of each pair for resisting braking torque, members carrying said road wheels and having pivotal connections with the links of each pair, and means for yieldingly resisting upward pivotal movement of the links, said last named means comprising coil springs acting between said wheel supporting means and said frame.

6. In a motor vehicle, the combination with a vehicle frame, of a pair of steerable road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle, the axes on opposite sides of the vehicle frame converging toward the forward end of the frame, and being inclined downwardly toward the rear with respect to a horizontal plane, longitudinally extending torque arms, each having articulated connection with said vehicle frame and with one of the links of each pair for resisting braking torque, steering knuckles supporting said road wheels for steering movement about substantially vertical axes, each of said knuckles being carried by the links of the associated pair, a longitudinally extending steering drag link operatively connected at the forward end thereof with one of said knuckles, and an operating member movably supported on said frame and having an articulated connection with said drag link, the location of said articulated connection and the length of said drag link being such that the forward end of the drag link describes an arcuate path about the point of connection of the drag link and the associated operating member conforming substantially to the arcuate path of movement of that part of the steering knuckle to which the drag link is connected, whereby undesired movement of the wheels about the steering axes thereof is avoided.

7. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined downwardly toward the rear with respect to a horizontal plane, longitudinally extending torque arms, each having articulated connection with said vehicle frame and with the respective lower links of each pair of links, members carrying said road wheels and having pivotal connections with the links of each pair, and means for yieldingly resisting upward pivotal movement of the links, that link of each pair having the uppermost axis being shorter than the other link of the pair, whereby the wheel tread is not materially altered as the road wheels rise and fall.

8. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined downwardly toward the rear with respect to a horizontal plane, longitudinally extending torque arms, each having articulated connection with said vehicle frame and with the respective lower links of each pair of links, members carrying said road wheels and having pivotal connections with the links of each pair, and coil springs acting between the lower link of each pair of links and said frame for resisting upward pivotal movement of the links.

9. In a motor vehicle, the combination with a vehicle frame, of a pair of steerable road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle, the axes on opposite sides of the vehicle frame converging toward the forward end of the frame, and being inclined downwardly toward the rear with respect to a horizontal plane, longitudinally extending torque arms, each having articulated connection with the vehicle frame and with one of the links of each pair of links, steering knuckles supporting said road wheels for steering movement about substantially vertical axes, each of said knuckles being carried by the links of the associated pair, a pair of longitudinally extending drag links, each of said drag links being operatively connected at the forward end thereof with one of said knuckles, operating members movably supported on opposite sides of said frame, each of said operating members having an articulated connection with one of said drag links, the relative disposition and length of the parts being such that the forward end of each of said drag links describes an arcuate path about the point of connection of the drag link and the associated operating member conforming substantially to the arcuate path of movement of that part of the steering knuckle to which the drag link is connected, whereby undesired movement of the wheels about the steering axes thereof is avoided, and means connecting said operating members for conjoint movement.

10. In an independent wheel suspension for motor vehicles, the combination with a vehicle frame, of a road wheel, means associated with said road wheel supporting the latter for rising and falling movement with respect to the vehicle frame, said means comprising a member carrying said road wheel, a pair of links pivotally connected to said member and said vehicle frame and disposed in vertically spaced relation, and means whereby the point of pivotal connection of one of said links with said member may be displaced laterally of the frame to vary the camber of the road wheel, said means comprising an adjustable bearing support for the inner end of said last named link on said frame.

11. In an independent wheel suspension for motor vehicles, the combination with a vehicle frame, of a steerable road wheel, means associated with said road wheel supporting the latter for rising and falling movement with respect to the vehicle frame, said means comprising a member carrying said road wheel for steering movement about a substantially vertical axis, a pair of links pivotally connected to said member and said vehicle frame and disposed in vertically spaced relation, and means whereby the point of pivotal connection of one of said links with said member may be displaced laterally of the frame, said means comprising an eccentric bearing affording the pivotal support for said last named link on the frame.

12. In a motor vehicle, the combination with a vehicle frame, of a pair of steerable road wheel assemblies disposed at opposite sides of and adjacent one end of the frame, means supporting said wheel assemblies for independent substantially vertical movement in separate arcuate paths, a longitudinally extending steering drag link having an operative connection adjacent the forward end thereof with one of said wheel assemblies, an operating member for said drag link, and an articulated connection between said member and said link adjacent the rearward end of the latter, the location of said articulated connection and the length of said link being such that the forward end of the link describes an arcuate path about the point of connection of the link and the said member conforming substantially to the arcuate movement of that part of the wheel assembly with which the link is connected.

13 In a motor vehicle, the combination with a vehicle frame, of a pair of steerable road wheel assemblies disposed at opposite sides of and adjacent one end of the frame, means supporting said wheel assemblies for independent substantially vertical movement in separate arcuate paths, said supporting means including an element operatively connected with said wheel, said element extending generally transversely of the frame and being pivotally supported on the latter for swinging movement in a substantially vertical plane, and a torque arm extending generally longitudinally of the vehicle having an operative connection with said element and an articulated connection with said frame, a longitudinally extending steering drag link having an operative connection adjacent the forward end thereof with one of said wheel assemblies, an operating member for said drag link, and an articulated connection between said member and said link adjacent the rearward end of the latter, the location of said articulated connection and the length of said link being such that the forward end of the link describes an arcuate path about the point of connection of the link and the said member conforming substantially to the arcuate movement of that part of the wheel assembly with which the link is connected.

CLYDE R. PATON.